E. MELAUN.
SAW CLAMP.
APPLICATION FILED JAN. 31, 1910.
1,003,772.
Patented Sept. 19, 1911.
3 SHEETS—SHEET 1.
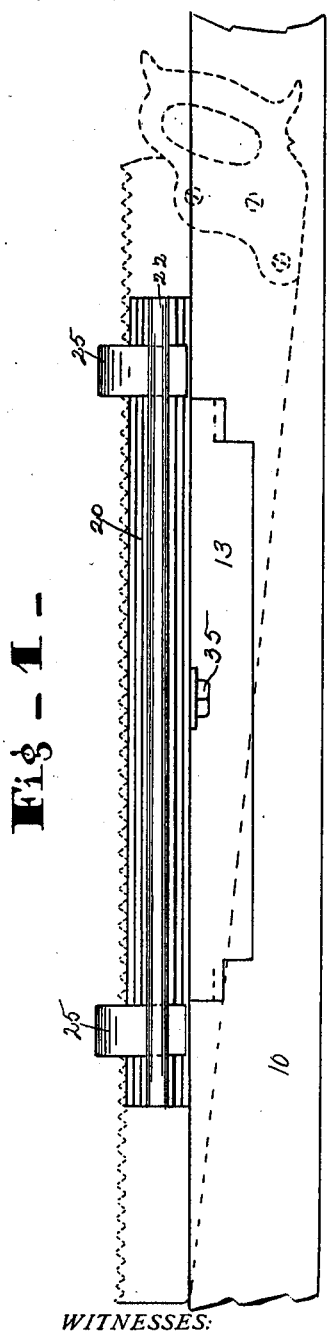
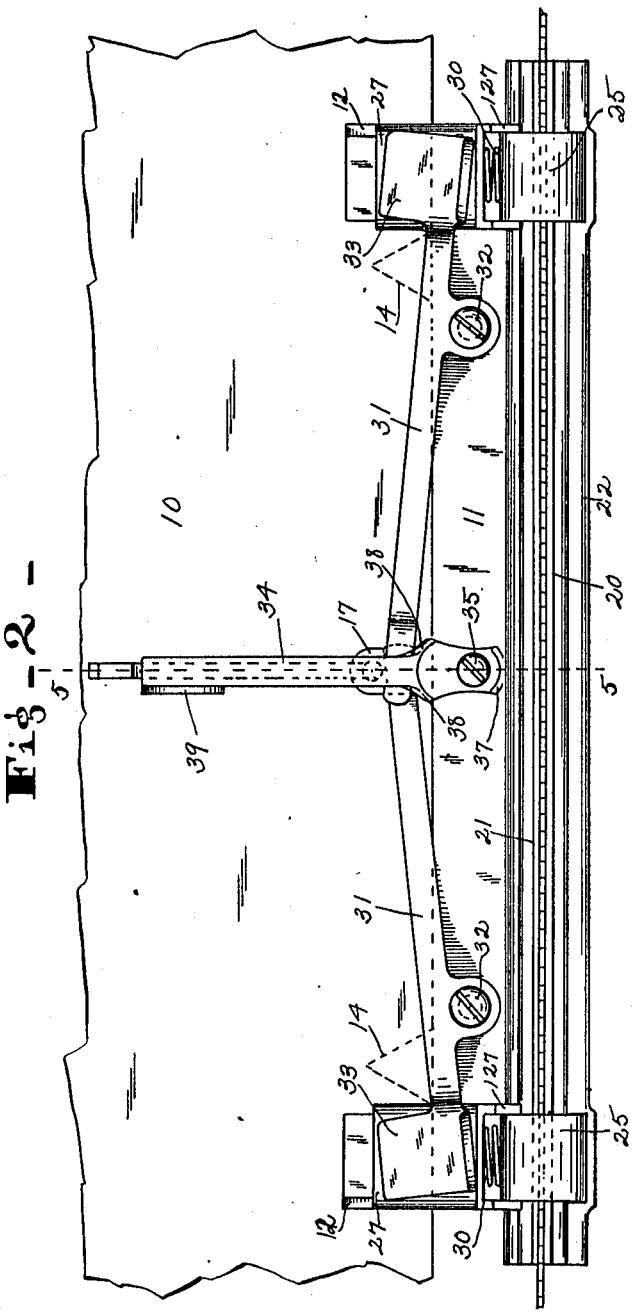
WITNESSES:
W. M. Gentle
O. M. McLaughlin
INVENTOR.
Ernst Melaun.
BY V. H. Lockwood
ATTORNEY.

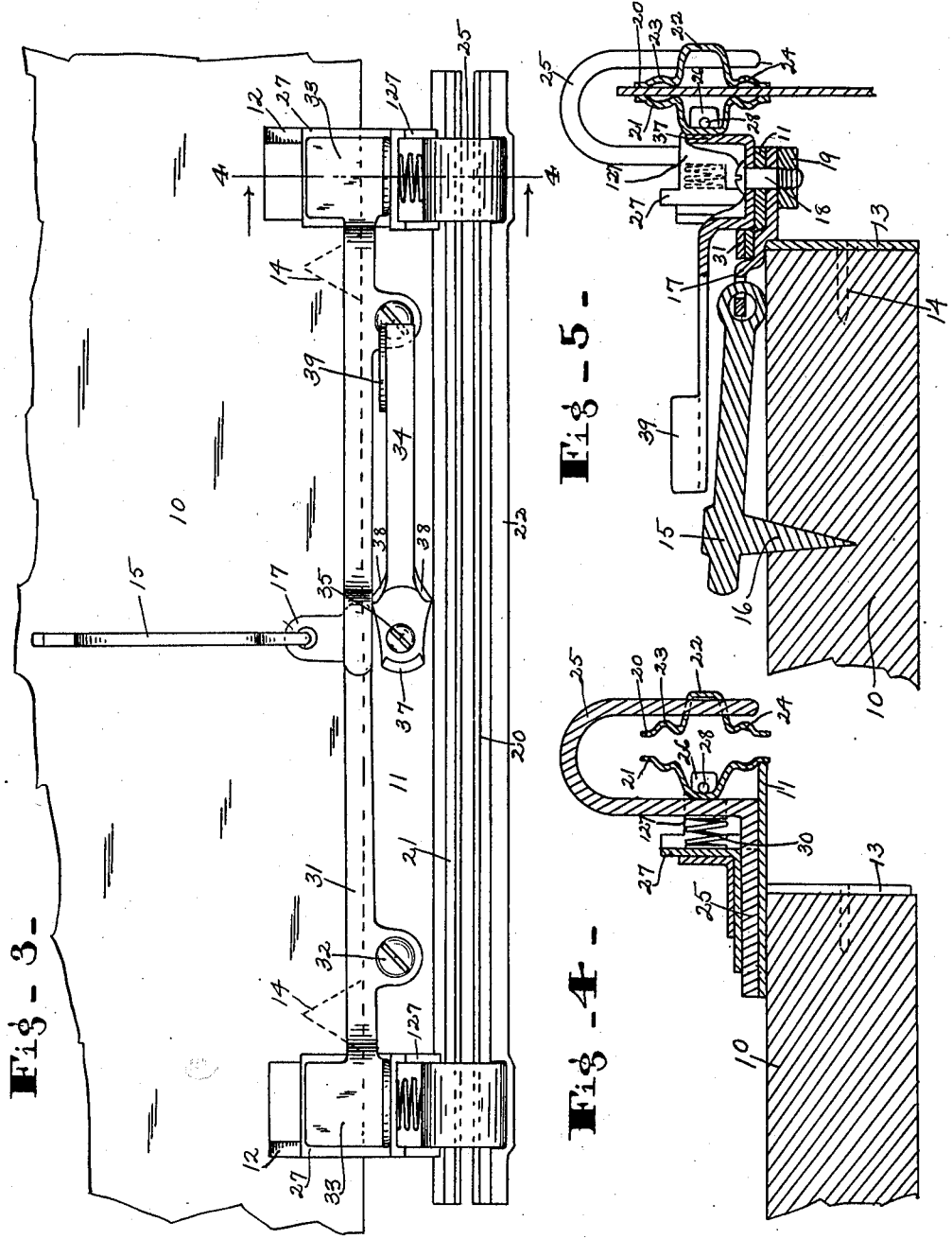

E. MELAUN.
SAW CLAMP.
APPLICATION FILED JAN. 31, 1910.

1,003,772.

Patented Sept. 19, 1911.
3 SHEETS—SHEET 3.

WITNESSES:
W. M. Gaille
O. M. McLaughlin

INVENTOR.
Ernst Melaun.
BY
ATTORNEY.

COLUMBIA PLANOGRAPH CO., WASHINGTON, D. C.

UNITED STATES PATENT OFFICE.

ERNST MELAUN, OF INDIANAPOLIS, INDIANA, ASSIGNOR OF ONE-HALF TO LEO M. RAPPAPORT, OF INDIANAPOLIS, INDIANA.

SAW-CLAMP.

1,003,772.   Specification of Letters Patent.   Patented Sept. 19, 1911.

Application filed January 31, 1910. Serial No. 541,192.

*To all whom it may concern:*

Be it known that I, ERNST MELAUN, of Indianapolis, county of Marion, and State of Indiana, have invented a certain new and useful Saw-Clamp; and I do hereby declare that the following is a full, clear, and exact description thereof, reference being had to the accompanying drawings.

The object of this invention is to improve the construction of saw clamps in order that they may be easily operated and firmly hold the saw.

In order to firmly hold the saw the clamp is provided with a plurality of biting or clamping edges. In the form shown there are four of these clamping or biting edges and at least a plurality of them are comparatively close together so that the clamp will successfully and firmly hold a very small saw.

Another feature relating to the clamping bars is that they are arranged so as to have a yielding clamp effect, and therefore while a saw is being filed or manipulated it is not liable to work loose. Also the clamps are drawn together at a sufficient number of points to enable them to effectually clamp even when formed of somewhat yielding material.

Another feature of the invention consists in providing a system of levers, all operated through one lever, for clamping and unclamping the bars and the one lever which is manipulated is centrally located.

Still another feature consists in providing a vertical plate of considerable dimensions relatively along or near the edge of the device, which can be put up against a table or bench and one hook or catch will suffice to hold the device in place. Lugs are located at the ends of said plate and they are adapted to penetrate the edge of the table or bench in mounting the device, hence it is very easily mounted and very easily operated.

The nature of the invention will be understood from the accompanying drawings and the following description and claims.

Figure 6:
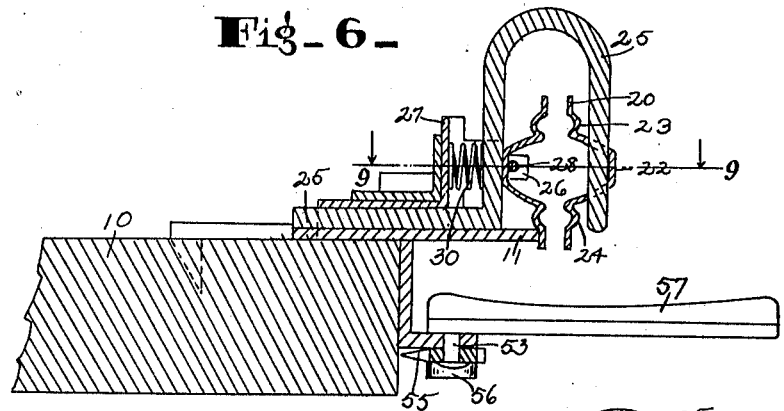
Figure 7:
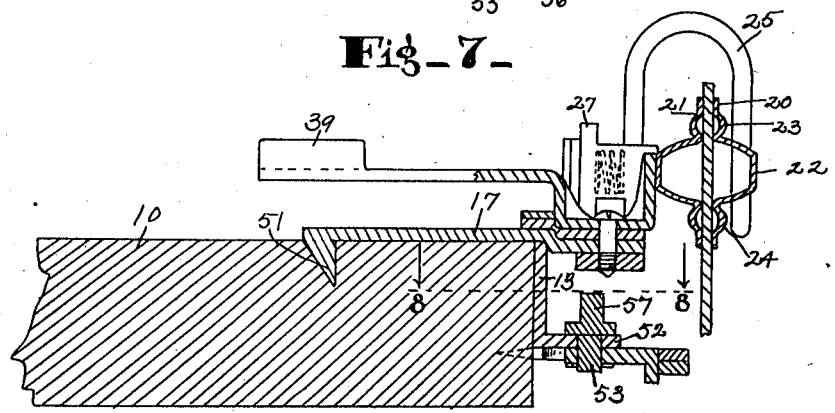
Figure 8:
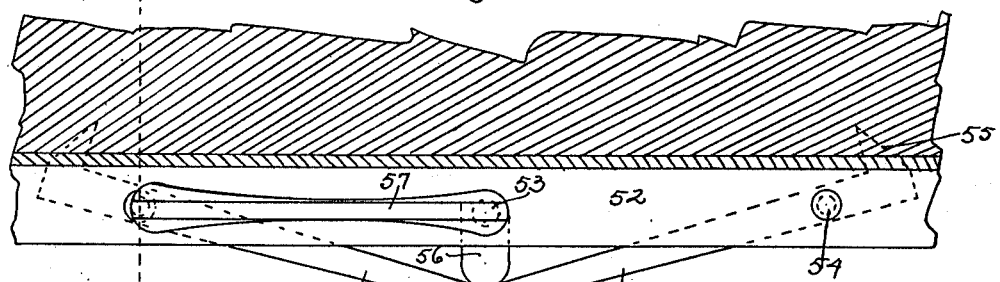
Figure 9:
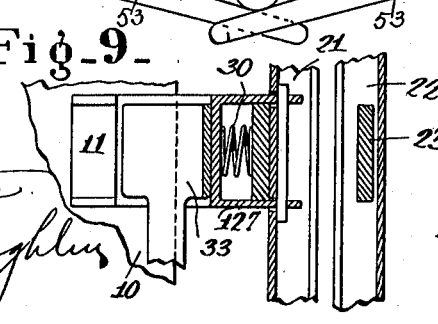

In the drawings Figure 1 is an elevation of the outer side of the device when mounted on a bench with the saw in its clamped position indicated by dotted lines. Fig. 2 is a plan view of the same in clamping position. Fig. 3 is a plan view of the same in an unclamped position. Fig. 4 is a section on the line 4—4 of Fig. 3 with the parts in unclamping position. Fig. 5 is a section on the line 5—5 of Fig. 2. Fig. 6 is a vertical transverse section through a modified form of the device and the adjacent portion of the table, showing the device as it is being placed on a table. Fig. 7 is the same showing the device after it has been fastened on the table. Fig. 8 is a section on the line 8—8 of Fig. 7. Fig. 9 is a section on the line 9—9 of Fig. 6.

In the drawings 10 is a work-bench or table and the saw clamp is mounted in connection therewith, as indicated in Fig. 5. Said saw clamp has what may be termed a base plate 11 which extends forwardly beyond the table but at each end has rearwardly extending portions 12 which rest upon the table top and has a downwardly extending plate 13 which abuts against the vertical edge of the table, and this downwardly extending plate or abutting plate has at each end a pointed lug 14 which penetrates the edge of the table, as indicated by dotted lines in Fig. 5. Therefore the plate 13 prevents a rearward movement and lugs 14 prevent vertical movement, the projections 12 prevent downward movement and the forward movement is prevented by a link hook 15 which has a prong 16 at its end which is driven into the top of the table or bench, see Figs. 3 and 5. Only one hook 15 is shown and it is located centrally and is pivoted to the arm 17 which is fastened to the under side of the plate 11 by a bolt 18 and nut 19. This arrangement renders the mounting of the device rather quick and easy.

The device is put in place on or against a bench by the left hand and the tap of a hammer on the lugs 14 will drive them in place and then a tap on the hook 15 will drive its prong into place. It is also easily removed, the hook 15 being pried up and released, and thus the device can be lifted away from the bench or table.

Outer and inner clamping bars 20 and 21 are provided and they are parallel with each other throughout their length and preferably formed of relatively thin but resilient and strong metal. Each bar has three corrugations or bends, one corrugation 22 being centrally located and relatively large and the corrugations 23 and 24, above and below the corrugation 22, that give four contact lines between the two clamping bars throughout their length, one at the upper edge, one at the lower edge, and one immediately below the center and one immediately above the same and when the saw is clamped in the device all four of these inwardly extending portions of the clamping bars bite and clamp the saw from end to end. When the bars are being compressed or moved toward the saw the upper and lower edges engage the saw first so that they have more than the other portions, a spring-like, biting hold on the saw.

The outer clamping bar 20 is secured at each end to the outer portion of upwardly arched arms 25 and the inner portions of said arms 25 are rigidly secured to the ends of the base plate 11. The inner clamping bar 21 is secured at each end on inwardly extending tongues 26 from each side of each of a pair of angle plates 27 slidable on the inner horizontal portion of the arms 25. A pin 28 extends through each tongue 26 to hold the bar 21 from escape, as said tongues extend through vertical slots in the bar 21. The side portions 127 bear against the outer surface of the bar 21 so as to push it against the bar 20 when the plates 27 are moved against the action of the springs 30 that lie between the upwardly extending parts of the plates 27 and arms 25, see Figs. 4 and 5.

Levers 31 are fulcrumed by pins 32 to the base plate 11, see Fig. 3, with their longer ends extending toward the middle of the device and overlapping each other and their shorter ends being widened at 33 and resting in the angles of the plates 27. Hence when the inner ends of the levers are pushed in a direction away from the clamping bars, as indicated in Fig. 2, the short ends of the levers will force the sliding plates 27 and the associated clamping bar 21 downwardly toward the other clamping bar and thus clamp the saw between the bars.

The levers 31 are actuated by an oscillatory lever 34 which is fulcrumed on the pin 35 and the base plate 11 and located centrally of the device, as seen in Fig. 2. This lever has an upwardly turned inner end 37 and when the lever 34 is turned to the position shown in Fig. 2 said end 37 of the lever 34 will bear strongly against the middle portion of the clamping bar 21 and clamp the bars at that point as tightly as at the ends of the clamps. At the same time the upwardly extending portion 38 of the lever 34, which bends upwardly like the bowl of a spoon, bears against the free ends of the levers 31 and forces them outwardly, as shown in Fig. 2, so as to effect the clamping of the ends of the bars 20 and 21.

39 is an upturned finger projection to catch hold of in throwing the lever 34 from the position shown in Fig. 3 to that shown in Fig. 2 and the reverse.

All the parts of the device excepting the springs, screws and arms 25 are made of relatively thin material so that the device is light and easy to manipulate.

In the modified form shown in Figs. 6 to 8, different means for securing the device to the table is shown. The bar 17 is continued rigidly and has a tooth 51 on the outer end thereof corresponding to the parts 15 and 16 in Fig. 5 where the part 15 is pivoted. When the device is applied to a table the bar 17 is placed flat on the table and the tooth 51 driven into the top of the table. From the vertical plate 13 there is in this modified form a horizontal plate 52 which carries a pair of levers 53 similar to the levers 31, which are fulcrumed between their ends at 54 and have teeth 55 on their shorter ends adapted to penetrate the side edge of the table under the influence of the cam 56 secured to the lever 57, which is fulcrumed at 58 to the plate 52. When the lever 57 is moved from the outer to the inner position, as shown in Fig. 8, the other levers 53 force the teeth 55 into the table, furnishing a more convenient and better holding means than that shown in the other figures.

What I claim as my invention and desire to secure by Letters Patent is:

1. A saw clamp including a pair of oppositely located clamping bars, means secured to said clamping bars midway their edges for supporting the same, and means for moving the supports of one clamping bar for clamping said bars together, each of said clamping bars being formed of metal adapted to spring and having at each side of the supporting means thereof along each edge a plurality of longitudinal inwardly projecting ribs or corrugations arranged on the opposing bars to meet each other, whereby one set of clamps may effectively clamp a very narrow saw as well as a very wide saw.

2. A saw clamp including a pair of parallel oppositely located clamping bars, and means for holding them, said bars being similarly corrugated longitudinally so that there is a plurality of longitudinal contact lines with the article being clamped near each other and on each side of the points where said clamping bars are held, whereby narrow as well as wide saws may be effectively clamped therein.

3. A saw clamp including a pair of parallel oppositely located clamping bars, a base plate, an arm secured at each end of the base plate that carries one of said clamping bars, slidable means for carrying the other clamping bar, levers for operating said slidable means, and a lever oscillatably mounted on said base plate between the ends of the clamping bars that simultaneously clamps the clamping bars together between their ends and actuates the first mentioned lever for causing the ends thereof to be clamped.

4. A saw clamp including a horizontal rigid bar extending therefrom with means on the end for penetrating the top of a table or bench, a vertical plate adapted to be placed against the edge of the table or bench, a horizontal plate secured to said vertical plate, a pair of levers pivoted between their ends on said horizontal plate and having points on their outer ends adapted to penetrate the edge of the table and with their inner ends meeting, and means mounted on said horizontal plate for engaging the inner ends of said lever and actuating them.

5. A saw clamp including a horizontal rigid bar extending therefrom with means thereon for penetrating the top of the table or bench, a vertical plate adapted to be placed against the edge of the table or bench a long plate secured to lower part of said vertical plate, a pair of levers pivoted between the ends of said horizontal plate and having points adapted to penetrate the edge of the table, and means for simultaneously actuating and releasing said pointed levers.

In witness whereof, I have hereunto affixed my signature in the presence of the witnesses herein named.

ERNST MELAUN.

Witnesses:
G. H. BOINK,
O. M. McLAUGHLIN.

---

Copies of this patent may be obtained for five cents each, by addressing the "Commissioner of Patents, Washington, D. C."